(12) United States Patent
Nicholson

(10) Patent No.: US 9,025,015 B2
(45) Date of Patent: May 5, 2015

(54) VERIFICATION OF PLAYOUT OF SIGNAGE

(71) Applicant: Robert Nicholson, Cumming, GA (US)

(72) Inventor: Robert Nicholson, Cumming, GA (US)

(73) Assignee: Convergent Media Systems Corporation, Alpharetta, GA (US)

( * ) Notice: Subject to any disclaimer, the term of this patent is extended or adjusted under 35 U.S.C. 154(b) by 316 days.

(21) Appl. No.: 13/690,148

(22) Filed: Nov. 30, 2012

(65) Prior Publication Data

US 2014/0152786 A1    Jun. 5, 2014

(51) Int. Cl.
*H04N 9/80* (2006.01)
*H04N 7/18* (2006.01)
*H04N 21/81* (2011.01)
*H04N 21/414* (2011.01)
*H04N 21/4223* (2011.01)
*H04N 21/44* (2011.01)

(52) U.S. Cl.
CPC ....... *H04N 21/812* (2013.01); *H04N 21/41415* (2013.01); *H04N 21/4223* (2013.01); *H04N 21/44008* (2013.01)

(58) Field of Classification Search
CPC .......... H04N 21/812; H04N 21/44008; H04N 21/4223; H04N 21/41415
USPC ............ 348/61, 180, 189; 386/248, 249, 250, 386/251
See application file for complete search history.

(56) References Cited

U.S. PATENT DOCUMENTS

| 7,937,723 B2 | 5/2011 | Weissmueller et al. |
| 2008/0168489 A1* | 7/2008 | Schraga .......................... 725/32 |

FOREIGN PATENT DOCUMENTS

JP    2011-135477    7/2011

* cited by examiner

*Primary Examiner* — Robert Chevalier
(74) *Attorney, Agent, or Firm* — Sutherland Asbill & Brennan LLP

(57) ABSTRACT

A video sign based advertising method involves providing a video display that is adapted to display images as an arrangement of pixels; sending video signals representing an advertisement to the video display; capturing an image of a sample of less than all of the pixels of the video display; determining if the captured sample matches a bitmap of the image sample of the image that is being sent to the display; logging play-out of the advertisement if a match is detected; and initiating an error condition action if a match is not detected. This abstract is not to be considered limiting, since other embodiments may deviate from the features described in this abstract.

31 Claims, 2 Drawing Sheets

VERIFICATION OF PLAYOUT OF SIGNAGE

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Digital signage uses LCD or other technology display panels to display advertisements (ads) that are purchased by advertisers. Such advertisements may be situated on vending machines or in public or private places for viewing by potential buyers. In some instances, the presence of a viewer triggers play-out of the ad, while in other cases the advertisements are played out on a schedule. Regardless, advertisers often wish to ascertain with certainty that the ad time purchased was in fact provided. Hence, they may require proof of play-out. Proof of play-out is difficult to verify because of all the issues involved. For example, log files of play-out by the digital signage player can be provided to the advertiser but the LCD screen may have been disconnected or turned off. Also, systems to monitor and record the functioning of the LCD screen's backlight and electrical pulses can be developed but there is no guarantee that the video cables are plugged in. Additionally, a malfunction of the display itself (e.g., as a result of heat induced blackout of an LCD panel in direct sunlight) could prevent the image from actually being viewable.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

Figure 1:
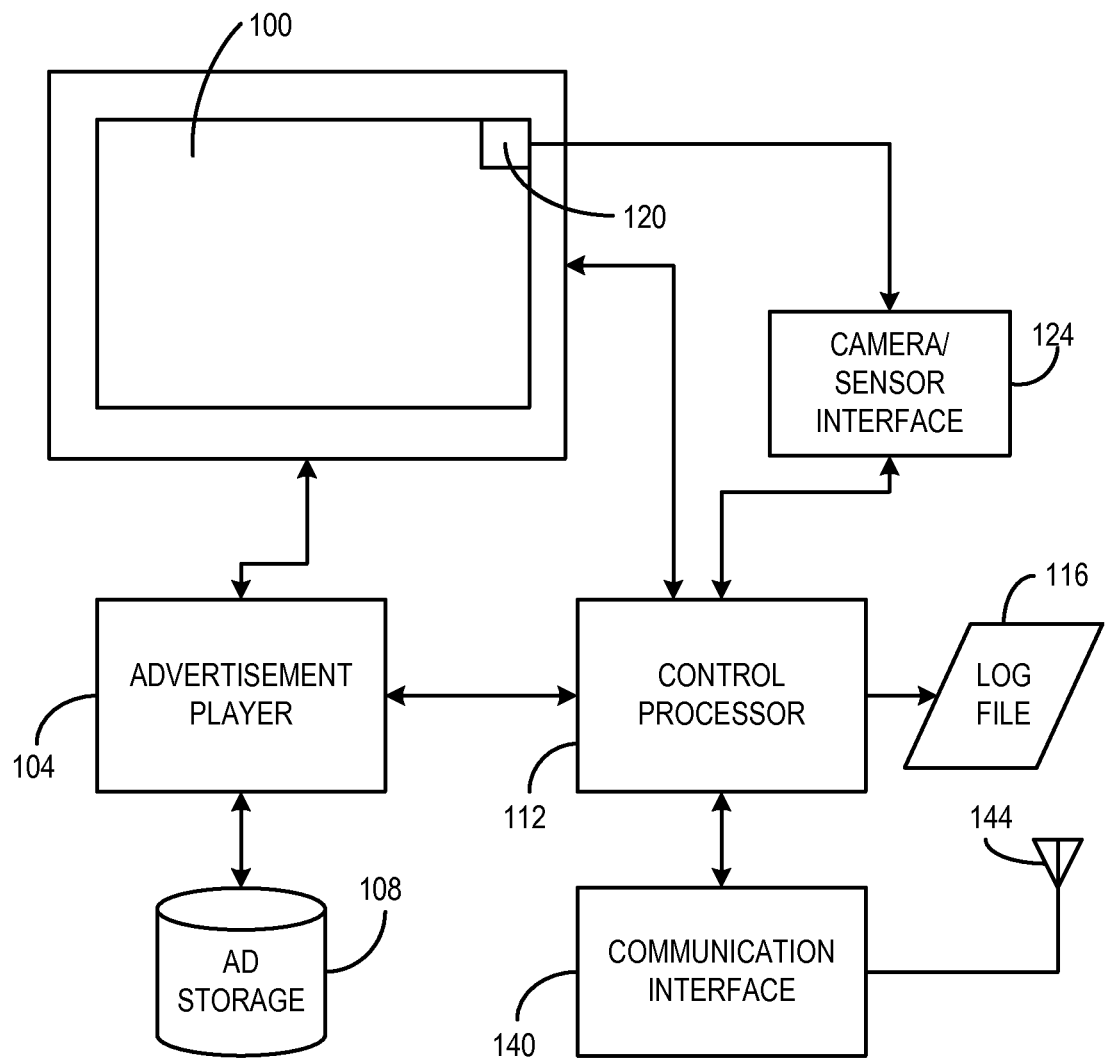
FIG. 1 is an example of a digital signage system consistent with certain embodiments of the present invention.

While this invention is susceptible to embodiments in many different forms, there is shown in the drawings, and will herein be described in detail, specific embodiments, with the understanding that the present disclosure of such embodiments is to be considered as an example of the principles and is not intended to limit the invention to the specific embodiments shown and described. In the description below, like reference numerals are used to describe the same, similar or corresponding parts in the several views of the drawings.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The terms "program," "computer program" or similar terms, as used herein, are defined as a sequence of instructions designed for execution on a computer system. A "program," or "computer program," may include a subroutine, a function, a procedure, an object method, an object implementation, an executable application, an applet, a servlet, a source code, an object code, a shared library/dynamic load library and/or other sequence of instructions designed for execution on a computer system. The terms "processor", "controller," "CPU," "Computer" and the like as used herein encompass both hard programmed, special purpose, general purpose and programmable devices and may encompass a plurality of such devices or a single device in either a distributed or centralized configuration without limitation.

Reference throughout this document to "one embodiment," "certain embodiments," "an embodiment," "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means any of the following: "A; B; C; A and B; A and C; B and C; A, B and C." An exception to this definition will occur only when a combination of elements, functions, steps or acts are in some way inherently mutually exclusive.

As noted above, digital signage uses LCD or other technology display panels to display advertisements (ads) that are purchased by advertisers. Such advertisements may be situated on vending machines or in public or private places for viewing by potential buyers. In some instances, the presence of a viewer triggers play-out of the ad, while in other cases the advertisements are played out on a schedule. Regardless, advertisers often wish to ascertain with certainty that the ad time purchased was in fact provided. Hence, they may require proof of play-out. Proof of play-out is difficult to verify because of all the issues involved. For example, log files of play-out by the digital signage player can be provided to the advertiser but the LCD screen may have been disconnected or turned off. Also, systems to monitor and record the functioning of the LCD screen's backlight and electrical pulses can be developed but there is no guarantee that the video cables are plugged in. Additionally, a malfunction of the display itself (e.g., as a result of heat induced blackout of an LCD panel in direct sunlight) or failure of a backlight system could prevent the image from actually being viewable.

In view of the above, it is desired to be able to certify the actual play-out of digital signage ads. This can be accomplished by the use of a small camera to sample a portion of the display's pixels to certify that an ad has been displayed.

In accord with certain implementations, a sensor such as a camera is used to monitor a portion of the display screen to verify whether the ad being logged by the digital signage player is being displayed on the display screen.

In one embodiment, a camera is placed above the corner of an LCD display screen to capture a small two dimensional pattern in the corner of the ad. The captured pattern will be unique for each ad and this pattern can be encoded to generate a numerical equivalent. The numerical equivalent can be logged and used to certify the play-out. In another embodiment, the digital signage player encodes a small distinct pattern in the ad's bitmap as an identifier or watermark. The digital signage verifies the pattern with a sampled pattern from a camera. In another embodiment, the pixels in the bitmap of the ad displayed by the digital signage are compared with the pixels captured by the camera. In the second and third embodiments, a calibration process can be used to determine the location of the camera above the LCD screen. The bitmap location can be calibrated by passing a single pixel wide horizontal line followed by a single pixel wide vertical line across the screen. Additionally, if desirable, a dot pattern can be displayed so that the processor can determine how many pixels are being monitored to account for displays of different sizes using the same sensor. The camera input is correlated with the video bitmap to place the bitmap below the camera. This calibration can be done during a boot process, for example using a test pattern.

Consider, by way of the examples, the use of LCD display panels as screens for digital signage. Digital signage uses such LCD panels to display ads. Advertisers, in order to ascertain that the ad time purchased was in fact provided, often require proof of play-out. Proof of play-out is difficult to verify because of all the issues involved as noted above. In view of these issues, it is desirable not only to verify that the signage system has sent an advertisement to a display, but also to verify that the display has in fact created a visible image of the advertisement as a verification of complete play-out. In the end, the most trustworthy method for verifying play-out is to have a camera that monitors the display screen and simultaneously verifies that the ad being logged by the digital signage player is in fact being displayed on the display screen.

Taking video captures of an entire display and evaluating the results would not be cost effective; but by placing a tiny camera or camera-like sensor over a portion of the display screen (e.g., in the corner), one can use several methods to certify ad play-out with almost 100% accuracy. Because it is possible that a significant number of pixels can become non-functional (as can happen when an LCD screen is exposed to direct sunlight), 100% accuracy is not possible with this method, but a high degree of accuracy can be expected.

Turning now to FIG. 1, a block diagram of a digital signage system consistent with certain example implementations is depicted in which a display 100 such as an LCD display screen is driven by an advertisement player system. The advertisement player system has an advertisement player 104 that drives the display 100 with video advertisement content that is stored and retrieved from any suitable storage such as ad storage 108. The advertisement player 104 operates under control of a control processor 112 which also controls and oversees operation of the entire system. When the control processor 112 instructs the advertisement player 104 to play an advertisement, the play-out event is logged to a log file 116 which contains a play-out time, e.g., start time of the play-out or end time of the play-out or both (where the term time usually includes date), and an advertisement identifier. In this manner, each play-out for each advertisement can be documented for use in determining the payment received for each advertisement. In this manner, an advertiser that pays for play-outs and pays on a fee per impression (play-out) basis can determine that a play-out actually occurred. The log file can then be manipulated to provide reporting as desired that may include summaries for each advertisement rendered.

However, as noted above, the mere fact that the control processor 112 and the advertisement player 104 are functioning properly to send a play-out of an advertisement to a display 100, in a conventional digital signage system there is no way to know with near certainty that the play-out in fact has produced the advertisement's visual image on the display 100. Hence, in accord with certain embodiments consistent with the present discussion, a sensor such as a camera 120 is provided that directly captures an image of the video being presented on the display 100. This camera 120 can be in the form of a small sensor, such as a small CCD array, affixed somewhat inconspicuously directly to the display (e.g., by a tape or adhesive that is optically transparent or nearly so) or by a more conventional camera and lens assembly that is in close proximity to the display and focused on a selected portion of the displayed image. For purposes of this discussion, if the display has a protective glass or other optically transmissive cover, affixing a camera 120 to the cover is considered the same as affixing to the display itself. The camera 120 is coupled through a camera interface 124 to the control processor 112 which views the sampling of pixels read by the camera 120 and determines that those pixels are highly correlated to the image that should be displayed at any given time in the advertisement that is being presented visually. By use of such an arrangement, the possibility that an object obstructs the ability of the camera or sensor 120 to view the pixels of interest is minimized.

In FIG. 1, the various interconnections can be any suitable standard or proprietary bus or interconnection structure or structures suitable to the type of communication being carried out.

Several methods can be used to determine that there is a high enough correlation between the displayed image and the advertisement, but in essence, the sample taken by the camera or sensor 120 is intended to assure that the display is in fact not turned off, failed or blacked out by some environmental condition such as overheating or physical damage to the display 100.

Method 1 involves encoding a very small, 2 dimensional pattern in the corner of the ad and have a small camera above that location. The pattern is preferably unique for every ad and has a numerical equivalent (such as a simplified QR code, a bar code, a logo, a numerical code, etc.). Any such recognizable pattern will be referred to as a pattern herein. As each ad is displayed, the digital signage player system can log the code being displayed. This method could result in modifications to the advertisement video, but log files generated by the codes detected should satisfy most advertisers' concerns about certifying actual visible play-out. While this solution is viable, it involves modification of the advertisement content itself. If all the hardware is working properly and all the images are correctly cataloged, then the logs presented to the customer will be accurate without need to make changes to the ad itself.

Method 2 has the digital signage player encoding a small distinct pattern in the ad's bitmap (could be randomly generated) and using a camera (again, for example, in the corner of the display 100 as shown) to sample the pattern so that the digital signage player can verify that the pattern is being reproduced. This method does not require any changes to the original advertisement.

Method 3 is similar to method 2 except that no pattern is involved. As the ad is being displayed, the digital signage player can simply compare the pixels seen by the camera with the pixels in the bitmap. If there is sufficiently high correlation, then the play-out can be considered verified. Since the actual displayed video can vary substantially based on color correction, brightness, contrast and environment, 100% accuracy is not required.

With Method 1, the camera should be accurately placed above the location of the pattern. With Methods 2 and 3, a calibration process can be used to determine the exact location of the camera above the LCD screen. In fact, calibration allows the camera to be at any location above the screen which could be useful if, for example, a particular corner of the LCD is preferred for mechanical or esthetic reasons.

In the case of a camera (sensor) 120 that captures an image at an inconspicuous location, such as a corner of the display, the camera can take the form of a small sensor that is affixed to the display's surface at the corner of the display, for example, using an adhesive. Such a sensor may, for example, be implemented as a small charge coupled device (CCD) element that is affixed to the display.

The sample size in terms of a number of pixels can be relatively low compared to the resolution of the display 100. In selection of a sample size, it is desirable to make the camera or sensor 120 as small as possible to keep it inconspicuous and to obscure a minimal amount of the display 100. As a point of reference, CCD sensors such as those currently used on cellular telephones are currently about 2.5×2.9 mm in size. The number of pixels seen by a camera is a function of the resolution and size of the LCD panel and the camera optics which includes the distance the camera is from the actual screen. For a large 1080 p screen (e.g., 60 inch diagonal), there are about 1.4 pixels/mm while for a small 1080 p screen (e.g., 15 inch diagonal), there are about 6 pixels per mm. If one assumes a worst case 1:1 optical coupling, such a CCD sensor on a large screen would see about 18 pixels (0.001%) while the same sensor on a small screen would see about 283 pixels (0.014%). Hence, the use of a sensor of this size on a large screen would be inadequate resolution for a QR code (the smallest of which currently uses 21×21 pixels). Thus a larger area would have to be captured to use such a code, but this does not mean that a CCD sensor of this size could not be employed for other techniques discussed herein. So, a sensor and/or sensor and optics combination should be at least large enough to capture a symbol being used to uniquely identify an advertisement if such an approach is used. If detection of color, contrast or brightness is the sole criteria, a sensor such as discussed about is adequate with 1:1 optics.

So, in accord with the above discussion, for example, the sensor may only capture less than 1%, and in most instances far less that 1% (e.g., less than 0.1% to 0.01%) of the pixels of the display. A sample area ranging from about 8×0.8 to 21×0.21 or 32×0.32 or 64×0.64 may be adequate to assure with high confidence that the display is in fact displaying the advertisement that is being sent thereto. In the case where a pattern, code or symbol such as a QR code or the like is used, only the number of pixels that can reasonably convey the pattern, code or symbol should preferably be used to verify display of the advertisement.

In the interest of standardizing hardware, it may be desirable to utilize the same camera or sensor 120 for multiple size displays. In such a case, the processor should be instructed or calibrated to know how large the display 100 panel is. Hence, as a part of the calibration process discussed herein, the processor may detect both the exact location of the sensor as well as how many pixels are being displayed. This can be accomplished using a dot pattern to determine the size of the area being monitored.

In the case of an LCD panel being used as display 100, TABLE 1 below provides an overview of the most likely scenarios for a failure in the display along with the ability to detect such failures.

TABLE 1

| Error Item No. | Flat Panel LCD Related Problem | Detection Without Sensor 120 | Detection With Sensor 120 |
|---|---|---|---|
| 1 | AC power disconnected or off - very frequent problem | Can be detected by digital signage player if LCD is being monitored | Redundant - but could use any number of techniques listed below |
| 2 | Broken CPU in LCD panel - relatively rare problem | Can be detected by digital signage player if LCD is being monitored | Redundant - but could use any number of techniques listed below |
| 3 | Broken or disconnected video cable - relatively common problem | Not usually detectable by monitoring | Contrast detection and gross color errors |
| 4 | Broken or dim backlight - relatively common problem | Not usually detectable by monitoring | Contrast detection |
| 5 | Broken LCD controller - rare problem | Not usually detectable by monitoring | Contrast detection and gross color errors |
| 6 | Broken LCD panel cable or connector - rare problem | Not usually detectable by monitoring | Contrast detection and gross color errors |
| 7 | Off color - very rarely reported problem | Cannot detect | Comparison of bitmap color and LCD color |
| 8 | Broken LCD panel due to solar or other environmental heat - relatively common problem | Cannot detect | Contrast detection in four corners of LCD |
| 9 | Excessive defective LCD pixels - very rarely reported as a problem | Cannot detect | Only applicable if in the area of the sensor |
| 10 | Broken glass - relatively common problem | Cannot detect | Edge detection if cracks hide pixels in area of sensor |

With reference to TABLE 1, it is noted that item 7 is the only one that would utilize evaluation of subtle color differences. In practice, complaints about this problem are rarely reported and even when it does happen the customer's ad is still being seen. When the error is quite significant, it will normally be reported by the customer or noticed during routine service. Although it is detectable by a comparison with a bitmap to color comparison, such detection may provide marginal returns on the effort toward detecting this problem.

Item 4 can be addressed by using a simple evaluation of brightness. Backlights lose intensity over time so brightness thresholds can be user selectable depending on when the customer or designer decides it's time for the display 100 to be replaced. Brightness can be evaluated by comparing the intensity of the adjacent pixels in the bitmap against those seen by the camera.

Items 3, 5, 6 usually cause a screen to go black so a simple evaluation of brightness will also discover the problem. However, it is possible to have one or two of the thee primary colors missing. In which case there would be significant and easily detectable color differences between what is in the bitmap and on the LCD screen. So, a comparison of the bitmap with the detected color from the camera or sensor 120 can be a gross comparison adequate to detect one or more missing primary colors.

Item 8 tends to happen frequently in certain types of installations, but the present solution is not optimal. However, it is capable of detecting problems when they extend to the sampled area. Detecting this problem with certainty using the present technique would utilize cameras in the more exposed parts of the LCD or use multiple sensors such as cameras in all four corners of the display 100 panel.

Concerning item 9, LCDs are routinely purchased with broken pixels. But, unless they occur closely together, they are rarely seen. Even a large loss of pixels would not prevent the customer's ads from being seen. Detection of this type of problem is often cost prohibitive unless the problem grows to an unacceptable extent. The problem is only detectable in the present technique if the defective pixels are observed by the sensor and results in a conclusion that there is a defect in the display.

It is noted that practical experience suggests that the need that the present discussion addresses is detecting that the LCD panel is working properly from end-to-end. The present discussion is an economical solution for providing a high level of assurance that this is the case.

So, when one considers the overall picture of the issue:
1) Just a black and white camera could be used for the vast majority of the issues involved because they can be evaluated by comparison of the contrast detected between pixels in the bitmap vs. the contrast detected between pixels on the LCD. A user selected or experimentally determined threshold can be used for making the decision that an error exists.
2) A color camera could be used to detect the small portion of problems related to missing primary colors.
3) Since this technique is primarily designed to detect problems in the signal integrity from the player to the LCD panel, not whether all of the LCD pixels are working, only enough pixels to perform a side by side comparison need to be sampled.

In view of the above, a determination of whether the image in the sign is good enough is subjective and largely dependent on backlight brightness (item 4) which generally should be determined by the customer's satisfaction. Subtle color errors are not primarily an issue in most instances, but verification of the actual display of a logged advertisement presentation on the display is of primary significance in the preferred implementations. That notwithstanding, a missing primary color is very distinctive and easily detected.

As noted above, there should be a correlation between the image displayed on the display 100 and the image bitmap for the advertisement or other identifier. However, as is clear from the above, it is noted that perfect 100% correlation is not necessary in order to deem that the video being displayed is in fact a match and hence the display is functioning correctly. This is especially true in the case where the image of the ad itself is used to identify the fact that the ad is indeed being displayed (Method 3 above), but is true in all instances. Due to variations in the color rendition on the display and the color definition in the bitmap, random inoperative pixels and other impairments, it is unlikely to achieve 100% correlation in color, hue, brightness, etc., unless both the image and the bitmap are all black and white pixels and any deviation from true black and white is corrected in the processing (e.g., by a decision making comparator that converts gray to either black or white). However, in an example of a display sample that includes contrasting edges that can be detected in the play-out, the presence of the edges at the correct location is adequate to establish that the display is operating. Similarly, an ad that is bitmapped in color video and rendered on the display 100 can be identified as having a correct color for purposes of the present discussion if the comparison detects a missing primary color in the video as displayed. Similarly brightness that exceeds a customer-established threshold is adequate to establish that the ad is actually being rendered with satisfactory quality on the display. Any suitable pattern matching algorithm can also be used. In certain implementations, a figure of merit such as correlation between the bitmap and the captured image can be compared to a threshold in order to deem that a match has been made.

Control processor 112 is also, in certain implementations, coupled to a wired or wireless communication interface 140. In this case, a wireless interface is depicted with an antenna 144 used for communication to a central station that carries out various services. In the event of detecting that a video display 100 appears to not be properly functioning, the control processor 112 can send an alarm to the central station so that service (which is often contractually required) can be immediately dispatched to repair a faulty display or other component of the system. Wireless connections can include the cellular telephone data infrastructure or wireless Internet infrastructure. Wired connections can be via the telephone or cable infrastructure, dedicated lines or any other suitable communication medium.

Figure 2:
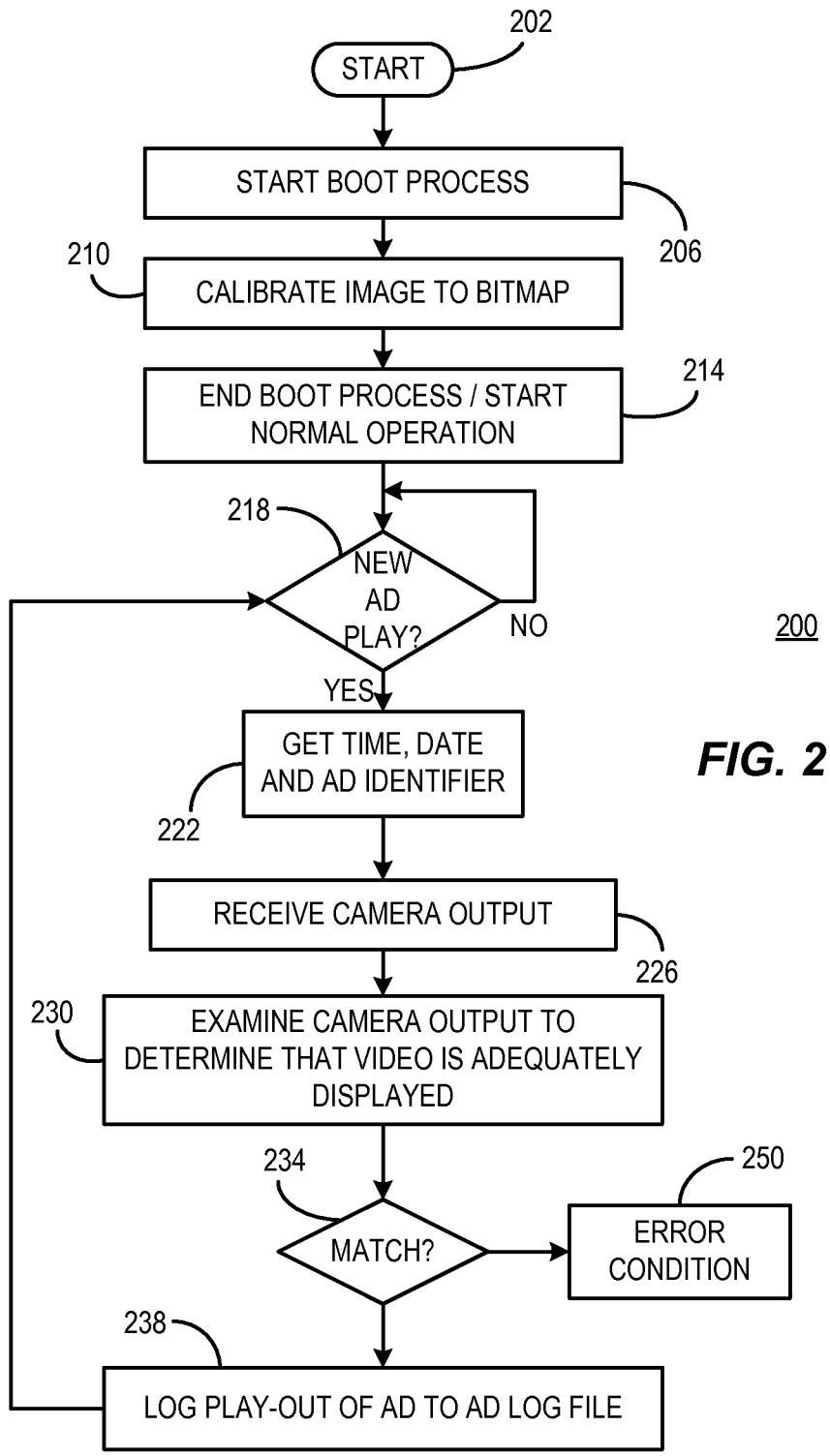
FIG. 2 is a flow chart of an example of a process consistent with certain embodiments of the present invention.

Referring now to FIG. 2, an example process 200 consistent with certain implementations of the present invention is disclosed starting at 202 after which a boot process starts at 206. During the boot process at 206, a calibration process can be implemented if needed for a particular implementation.

In accordance with certain implementations, the bitmap location would be calibrated at 210 during the boot process. In one example, to calibrate, a single pixel wide horizontal line followed by a single pixel wide vertical line could be rendered passing across the screen. Correlating the camera input with the video bitmap is all that would be needed to accurately place the bitmap below the camera.

Once this calibration is completed, the boot process ends and normal operation of the digital signage system begins at 214. When a new ad is played-out at 218, the time and date and an ad identifier are fetched from memory or storage at 222. The camera output is received at 226 and this camera output is examined to determine if the video play-out is acceptable by examination of the ad image being sampled by the camera at 230 using any of the criteria discussed above. If a match is deemed to have been obtained at 234 on the basis of the examination in 230, the play-out of the advertisement from the digital signage system is logged to the ad log file at 238. The process then returns to 218 to process the next advertisement. However, if there is no match at 234, an error condition is declared by the processor at 250 and error processing ensues. This error processing can take many forms. For example, the error condition can be logged and a reboot can be initiated in an attempt to recover. In other example error processing, the central station can be notified by the processor via the network interface (either before or after any local attempts to resolve the error by the processor) and a service technician can be dispatched. Other error processing can be devised by those skilled in the art upon considering the present teachings.

It should be noted that a check of the integrity of the LCD screen's visual output as described is not necessary for each frame, although that too can be implemented. Generally speaking, the check of the visual image in the manner described can be done once per advertisement or multiple times per advertisement, on a time based schedule, or in any other suitable manner consistent with the present teachings.

Thus, in accord with certain example implementations, a video sign based advertising system has a video display that is adapted to display images as an arrangement of pixels. An advertisement player is configured to send video signals representing an advertisement to the video display. A sensor is configured to capture an image of a sample of less than all of the pixels of the video display. One or more processors are configured to: determine if the sample captured by the sensor matches a bitmap of the image sample of the image that is being sent to the display; log a play-out of the advertisement if a match is detected; and initiate an error condition action if a match is not detected.

In certain implementations, the sample captured by the sensor is in a location that contains a distinct pattern that is unique to each advertisement. In certain implementations, the sample captured by the sensor is in a location that contains a distinct pattern that is generated by the processor and inserted into the video image sent to the display. In certain implementations, the distinct pattern is randomly generated by the processor for each advertisement. In certain implementations, the sample captured by the sensor is at a corner of the display. In certain implementations, the sensor comprises a charge coupled device sensor that is affixed to a surface of the display. In certain implementations, the sensor comprises a camera situated in a location that captures the sampled area of the display. In certain implementations, the sample is less than 1% of the image area. In certain implementations, a match is deemed to have occurred if the sampled area of the displayed image has a brightness that is greater than a brightness threshold. In certain implementations, a match is deemed to have occurred if the sampled area contains one or more edges that match edges in the bitmap of the sampled area. In certain implementations, the processor is further configured to carry out a pattern matching algorithm on the sampled area to identify the pattern defined in the bitmap of the sampled area. In certain implementations, the error condition action comprises alerting central office of the error via a communication interface. In certain implementations, the processor is further configured to carry out a sensor alignment process as a part of a system boot operation. In certain implementations, the sensor comprises a black and white sensor.

Another example video sign based advertising system has a video display that is adapted to display images as an arrangement of pixels. An advertisement player is configured to send video signals representing an advertisement to the video display. A sensor is configured to capture an image of a sample of less than 1% of all of the pixels of the video display at a corner of the video display. The sensor can be a charge coupled device that is situated at the corner of the video display and is affixed to a surface of the video display. One or more processors are configured to: determine if the sample captured by the sensor matches a bitmap of the image sample of the image that is being sent to the display; log a play-out of the advertisement if a match is detected; and initiate an error condition action if a match is not detected.

A video sign based advertising method involves providing a video display that is adapted to display images as an arrangement of pixels; sending video signals representing an advertisement to the video display; capturing an image of a sample of less than all of the pixels of the video display; at a processor; determining if the captured sample matches a bitmap of the image sample of the image that is being sent to the display; the processor logging a play-out of the advertisement if a match is detected; and the processor initiating an error condition action if a match is not detected.

Another video sign based advertising method involves providing a video display that is adapted to display images as an arrangement of pixels; sending video signals representing an advertisement to the video display; capturing an image of a sample of less than all of the pixels of the video display; determining if the captured sample matches a bitmap of the image sample of the image that is being sent to the display; logging play-out of the advertisement if a match is detected; and initiating an error condition action if a match is not detected. Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein are or may be implemented using one or more programmed processors executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A video sign based advertising system, comprising:
a video display that is adapted to display images as an arrangement of pixels;
an advertisement player configured to send video signals representing an advertisement to the video display;
a sensor configured to capture an image of a sample of less than all of the pixels of the video display;
one or more processors configured to:
determine if the sample captured by the sensor matches a bitmap of the image sample of the image that is being sent to the display;
log a play-out of the advertisement if a match is detected; and
initiate an error condition action if a match is not detected.

2. The system in accordance with claim 1, where the sample captured by the sensor is in a location that contains a distinct pattern that is unique to each advertisement.

3. The system in accordance with claim 1, where the sample captured by the sensor is in a location that contains a distinct pattern that is generated by the processor and inserted into the video image sent to the display.

4. The system in accordance with claim 1, where the distinct pattern is randomly generated by the processor for each advertisement.

5. The system in accordance with claim 1, where the sample captured by the sensor is at a corner of the display.

6. The system in accordance with claim 1, where the sensor comprises a charge coupled device sensor that is affixed to a surface of the display.

7. The system in accordance with claim 1, where the sensor comprises a camera situated in a location that captures the sampled area of the display.

8. The method according to claim 1, where the sample is less than 1% of the image area.

9. The method according to claim 1, where a match is deemed to have occurred if the sampled area of the displayed image has a brightness that is greater than a brightness threshold.

10. The system in accordance with claim 1, where a match is deemed to have occurred if the sampled area contains one or more edges that match edges in the bitmap of the sampled area.

11. The system in accordance with claim 1, where the processor is further configured to carry out a pattern matching algorithm on the sampled area to identify the pattern defined in the bitmap of the sampled area.

12. The system in accordance with claim 1, where the error condition action comprises alerting a central office of the error via a communication interface.

13. The system in accordance with claim 1, where the processor is further configured to carry out a sensor alignment process as a part of a system boot operation.

14. The system in accordance with claim 1, where the sensor comprises a black and white sensor.

15. A video sign based advertising system, comprising:
a video display that is adapted to display images as an arrangement of pixels;
an advertisement player configured to send video signals representing an advertisement to the video display;
a sensor configured to capture an image of a sample of less than 1% of all of the pixels of the video display at a corner of the video display;
where the sensor comprises a charge coupled device that is situated at the corner of the video display and is affixed to a surface of the video display;
one or more processors configured to:
determine if the sample captured by the sensor matches a bitmap of the image sample of the image that is being sent to the display;
log a play-out of the advertisement if a match is detected; and
initiate an error condition action if a match is not detected.

16. The system in accordance with claim 15, where the sample captured by the sensor is in a location that contains a distinct pattern that is unique to each advertisement.

17. The system in accordance with claim 15, where the sample captured by the sensor is in a location that contains a distinct pattern that is generated by the processor and inserted into the video image sent to the display.

18. The system in accordance with claim 15, where the distinct pattern is randomly generated by the processor for each advertisement.

19. A video sign based advertising method, comprising:
providing a video display that is adapted to display images as an arrangement of pixels;
sending video signals representing an advertisement to the video display;
capturing an image of a sample of less than all of the pixels of the video display;
at a processor, determining if the captured sample matches a bitmap of the image sample of the image that is being sent to the display;
the processor logging a play-out of the advertisement if a match is detected; and
the processor initiating an error condition action if a match is not detected.

20. The method in accordance with claim 19, where the sample captured by the sensor is in a location that contains a distinct pattern that is unique to each advertisement.

21. The method in accordance with claim 19, where the sample captured by the sensor is in a location that contains a distinct pattern that is generated by the processor and inserted into the video image sent to the display.

22. The method in accordance with claim 19, where the distinct pattern is randomly generated by the processor for each advertisement.

23. The method in accordance with claim 19, where the sample captured by the sensor is at a corner of the display.

24. The method in accordance with claim 19, where the sensor comprises a charge coupled device sensor that is affixed to a surface of the display.

25. The method in accordance with claim 19, where the sensor comprises a camera situated in a location that captures the sampled area of the display.

26. The method according to claim 19, where the sample is less than 1% of the image area.

27. The method according to claim 19, where a match is deemed to have occurred if the sampled area of the displayed image has a brightness that is greater than a brightness threshold.

28. The method in accordance with claim 19, where a match is deemed to have occurred if the sampled area contains one or more edges that match edges in the bitmap of the sampled area.

29. The method in accordance with claim 19, where the processor is further configured to carry out a pattern matching algorithm on the sampled area to identify the pattern defined in the bitmap of the sampled area.

30. The method in accordance with claim 19, where the error condition action comprises alerting a central office of the error.

31. The method in accordance with claim 19, further comprising carrying out a sensor alignment process as a part of a system boot operation.

\* \* \* \* \*